United States Patent [19]

Hluchyj et al.

[11] Patent Number: 5,115,429
[45] Date of Patent: May 19, 1992

[54] DYNAMIC ENCODING RATE CONTROL MINIMIZES TRAFFIC CONGESTION IN A PACKET NETWORK

[75] Inventors: Michael G. Hluchyj, Wellesley; Nanying Yin, Cambridge, both of Mass.

[73] Assignee: Codex Corporation, Mansfield, Mass.

[21] Appl. No.: 561,623

[22] Filed: Aug. 2, 1990

[51] Int. Cl.$^5$ .............................................. H04J 3/22
[52] U.S. Cl. ..................................... 370/84; 370/94.1; 370/94.3
[58] Field of Search ................. 370/94.1, 84, 60, 85.1, 370/85.2, 85.3, 85.6, 110.1, 79, 94.3; 455/38; 340/825.44, 825.5, 825.51, 825.03, 825.04; 341/50, 51, 61

[56] References Cited

U.S. PATENT DOCUMENTS

| | | | |
|---|---|---|---|
| 4,074,232 | 2/1978 | Otomo et al. | 370/94.1 |
| 4,763,319 | 8/1988 | Rozenblit | 370/84 |
| 4,771,391 | 9/1988 | Blasbalg | 370/94.1 |
| 4,771,425 | 9/1988 | Baran et al. | 370/110.1 |
| 4,779,267 | 10/1988 | Limb | 370/94.1 |
| 4,816,820 | 3/1989 | Davis | 370/84 |
| 4,839,891 | 6/1989 | Kobayashi et al. | 370/60 |
| 4,890,282 | 12/1989 | Lambert et al. | 370/79 |
| 4,903,261 | 2/1990 | Baran et al. | 370/94.2 |
| 4,965,789 | 10/1990 | Bottau et al. | 370/79 |
| 4,972,411 | 11/1990 | Fushimi et al. | 370/110.1 |
| 4,993,024 | 2/1991 | Quinguis et al. | 370/84 |

OTHER PUBLICATIONS

IEEE Transaction on Communications, vol. Com-28, No. 3, Mar. 1980, Theodore Bially, Bernard Gold, and Stephanie Seneff, "A Technique for Adaptive Voice Flow Control in Integrated Packet Networks", pp. 325-333.
IEEE Transaction on Communications, vol. Com-37, No. 7, Jul. 1989, Kotikalapudi Sriram, and David M. Lucantoni, "Traffic Smoothing Effects of Bit Dropping in a Packet Voice Multiplexer", pp. 703-712.
International Journal of Digital and Analog Cabled Systems, vol. 1, 77-85 (1988), Israel Cidon, and Inder S. Gopal, "PARIS: An approach to Integrated High-Speed Private Networks", pp. 77-85.
Proc. ACM SIGCOMM '88, Aug. 1988, K. K. Ramakrishnan, and Raj Jain, "A Binary Feedback Scheme for Congestion Avoidance in Computer Networks with a Connectionless Network Layer", pp. 303-313.
Optical Engineering, Jul. 1988, Gunnar Karlsson and Martin Vetterli, "Subband Coding of Video for Packet Networks".
IEEE Journal on Selected Areas in Communications, vol. 7, Jun. 1989, Christodoulos Chamzas and Donald Duttweiler, "Encoding Facsimile Images for Packet-Switched Networks".
IEEE Journal on Selected Areas in Communications, vol. 7, Jun. 1989, Fumio Kishino, Katsutoshi Manabe, Yasuhito Hayashi, and Hiroshi Yasuda, "Variable Bit-Rate Coding of Video Signals for ATM Networks".

Primary Examiner—Benedict V. Safourek
Assistant Examiner—Alpus H. Hsu
Attorney, Agent, or Firm—Darleen J. Stockley; Charles L. Warren

[57] ABSTRACT

This invention is suited for a packet network that carries bursty data. A mechanism is coupled to an edge node for coding bursty information into a digital format at either a first coding rate of a second coding rate which is less than the first rate. A mechanism senses traffic overload of one or more intermediate nodes carrying the bursty informaton. A mechanism which is responsive to the overload sensing mechanism causes the coding mechanism to switch from the first rate to the second rate while a traffic overload is sensed. Thus, network demand requirements are reduced and the overload will be alleviated.

12 Claims, 3 Drawing Sheets

DYNAMIC ENCODING RATE CONTROL MINIMIZES TRAFFIC CONGESTION IN A PACKET NETWORK

BACKGROUND OF THE INVENTION

This invention is generally directed to capacity overload in a packet network and is more specifically directed to minimizing capacity overload by controlling the rate at which bursty data, such as voice and video, is encoded.

Packet networks have been recognized as an efficient means for carrying computer data traffic. Circuit switch networks have been generally thought to be more suited for carrying voice and video traffic. However, it is believed that packet networks will be relied upon in the future for carrying coded information such as voice and video in addition to computer data.

In a normal telephone conversation, a party typically talks less than 50% of the time. The use of speech activity detection (SAD) in a packet voice network provides a potential of a two-to-one statistical gain. However congestion may occur in the buffers or queues of nodes for a transmission link when the information load exceeds the link capacity due to coincident speech bursts from several speech sources. This type of congestion can last for a time period long relative to the length of a talkspurt especially over lower capacity links. Voice quality is degraded due to the discarding of packets, and increased packet delay time. To avoid such degradation, little or no statistical gain is typically employed for relatively low capacity links. For example, a 64 kbps transmission link typically supports only four 16 kbps voice calls, even with SAD, resulting in a low utilization efficiency.

When video traffic is carried in a packet network, the information rate from a video coder varies depending on the instantaneous activity of the scene. Thus, the rate increases during active motion (or scene changes) and decreases during inactive periods. Congestion similar to voice traffic may occur in a transmission link when several sources are in active motion. The duration of congestion is proportional to the time of active motion. During the congestion, the video quality is degraded due to packet loss and increased delay time.

One technique which has been utilized to control the overloading of packet voice network queues due to talkspurt activity operates by dropping or discarding less important voice information in packets during peak congestion periods. In order to reduce overload conditions using a discard technique, intermediate nodes in the packet network must recognize the overload condition and discard voice information within each packet according to a predetermined technique. The packet processing requirements increase the computing power required for each node resulting in increased cost and network complexity. Relatively poor voice quality may result depending upon the particular technique used, and the length and magnitude of the overload condition. IEEE Transaction on Communications, Vol. Com-28, No. 3, March 1980, Theodore Bially, Bernard Gold, and Stephanie Seneff, "A Technique for Adaptive Voice Flow Control in Integrated Packet Networks", pp. 325-333; IEEE Transaction on Communications, Vol. Com-37, No. 7, July 1989, Kotikalapudi Sriram, and David M. Lucantoni, "Traffic Smoothing Effects of Bit Dropping in a Packet Voice Mutiplexer", pp. 703-712.

Control algorithms have been proposed to maximize the throughput of computer data traffic in packet networks. In the article, "PARIS: An Approach to Integrated High-Speed Private Networks" by Israel Cidon and Inder S. Gopal in the International Journal of Digital and Analog Cabled Systems, Vol. 1, No. 2, April-June (1988), pp. 77-85, an input throttle is used at the source node. To be allowed into the network, a data packet under the control of a throttle algorithm requires a token. Tokens are produced periodically at a predetermined rate until the number of tokens reaches a maximum value. Thus, the average transmission rate of packets is less than or equal to the token rate. If the network is lightly loaded, the throttle control algorithm can increase the token generating rate thereby increasing the packet transmission rate. A congestion bit in data packet acknowledgements indicates the presence of congestion in the network. The source node will then reduce the token generation rate until it reaches a predetermined minimum rate. The rate is allowed to increase as packets build up at the input throttle buffer after the congestion ceases. This throttle control algorithm is not suited for voice traffic since voice packets are normally generated at a fixed periodic rate and cannot be delayed by accumulation at the throttle buffer. Similarly, the real-time nature of video prevents video packets from being delayed. Also, acknowledgement packets are not normally utilized for voice or video traffic and hence would not be available to carry the network congestion information.

Congestion avoidance is addressed in the article, "A Binary Feedback Scheme for Congestion Avoidance in Computer Networks with a Connectionless Network Layer" by K. K. Ramakrishnan and Raj Jain in Proc. ACM SIGCOMM'88, August 1988, pp. 303-313. In this method, network feedback is utilized to adjust the allowed number of unacknowledged packets in the network which corresponds to the transmission window size. Intermediate nodes detect congestion and set a congestion indication bit on packets flowing in the forward direction. The congestion indication is communicated back to the source of information via transport level communication. This method is not generally applicable to a packet network carrying voice or video traffic since window control is not suited for coded information sources.

There exists a need in a packet network to handle temporary overloads due to the bursty nature of voice and video information while maintaining high quality. This need is most crucial on relatively low capacity links in which the statistical probability of such congestion is higher and the duration of congestion is longer than on higher capacity links.

SUMMARY OF THE INVENTION

It is an object of the present invention to provide a solution to the above needs while minimizing the degradation of bursty data carried over a packet network.

In accordance with the present invention, a preferred embodiment includes a forward congestion indication bit (FCIB) and a reverse congestion indication bit (RCIB) as part of each packet header. A voice coder is capable of coding the voice at two or more rates. Upon detecting network congestion, an intermediate node sets the FCIB flag in the forward direction. The destination node upon sensing the FCIB flag sets the RCIB flag for packets bound for the source node. Upon the source node receiving a packet with RCIB flag set, the voice coder responds by lowering the coding rate. Congestion is thus relieved by sending voice information at a slower data rate during the overload period. Upon the cessation of congestion along the path, FCIB flag will be reset or cleared thereby causing the destination source to clear the RCIB flag. When this is received by the source node, the voice coder increases its data rate.

The system is preferably designed for the voice coder to normally run at the high data rate to provide high quality voice. Since the lower rate should be used for only a small percentage of time, the caller should not perceive a substantial overall voice quality degradation. The present invention can also be utilized for video applications in the same manner described for the voice application.

DETAILED DESCRIPTION

Figure 1:
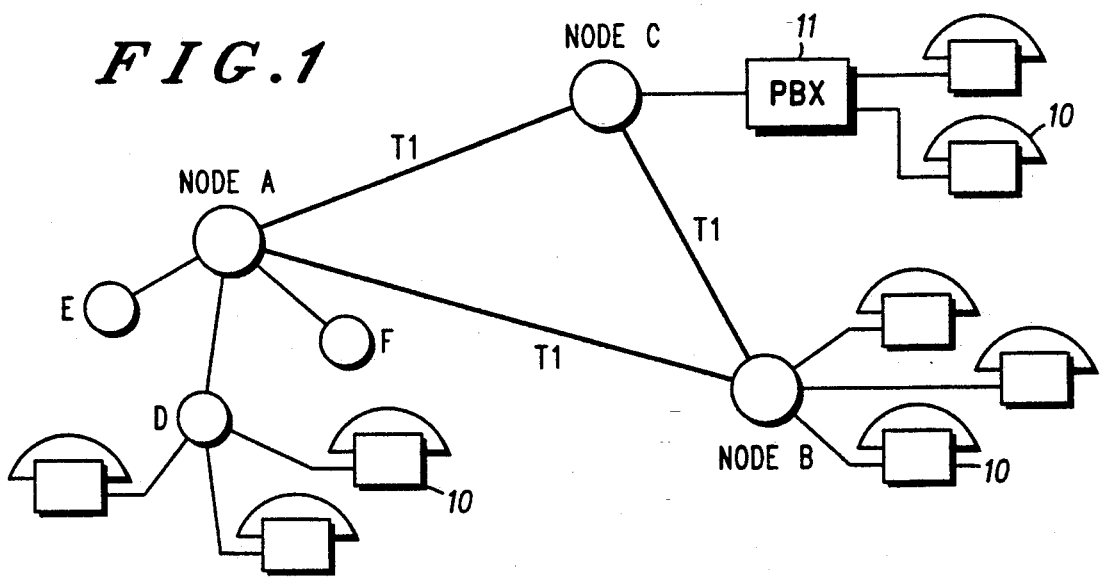
FIG. 1 is a schematic diagram of a packet network in accordance with the present invention.

FIG. 1 illustrates an exemplary packet network in which nodes A, B, and C are connected to each other such as by T1 communication links. Nodes D, E, and F are connected to node A by a lower capacity channel such as 64 kbps. Nodes B and D each support telephone instruments 10. Node C also provides a communication link with private branch exchange (PBX) 11. The PBX supports a plurality of telephone instruments 10. The present invention is especially suited for improving the utilization of a lower speed link such as between nodes A and D where node D represents an edge node for bursty coded information such as voice or video and node A is an intermediate node.

Figure 2:
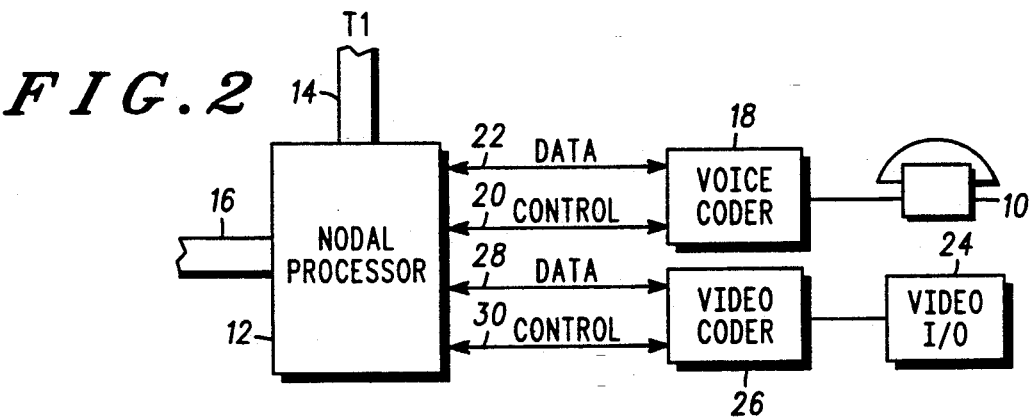
FIG. 2 is a block diagram of an exemplary node of the packet network.

FIG. 2 illustrates an exemplary edge node of a packet network. A nodal processor 12 controls packet traffic between T1 link 14 and a slower speed link 16. The processor also accepts voice traffic from telephone instrument 10 which is digitized by voice coder 18. The voice coder preferably consists of a known voice coder capable of encoding and decoding voice traffic at two or more different rates such as 32 kbps and 16 kbps. Alternatively, voice coder 18 can consist of a first and second coder operating at different rates. The rate utilized by voice coder 18 is selected by nodal processor 12 by control channel 20. Data channel 22 couples digitized voice traffic between the nodal processor and voice coder.

Nodal processor 12 may also accept video traffic from video I/O device 24 which may consist of a video camera, video display terminal, or both. A video coder 26 translates the video information from video I/O 24 into a digital signal supplied by data channel 28 to nodal processor 12. The video coder is operable at two or more different rates as selected by the nodal processor by signals sent over control channel 30. Various types of video coders and coding have been suggested. G. Karlsson and M. Vetterli, "Subband Coding of Video for Packet Networks", Optical Engineering, Vol. 27, No. 7, pp. 574–586, July 1988; C. Chamzas and D. L. Duttweiler, "Encoding Facsimile Images for Packet-Switched Networks", IEEE J. on Selected Areas in Communications, Vol. 7, No. 5, pp. 857–864, June 1989. F. Kishino, K. Manaabe, Y. Hayashi, and H. Yasuda, "Variable Bit-Rate Coding of Video Signals for ATM Networks", IEEE J. on Selected Areas in Communications, Vol. 7, No. 5, pp. 801–806, June 1989.

Although only one representative audio and video source is shown in FIG. 2, it will be understood by those skilled in the art that a plurality of such sources may be accommodated. The quantity of such traffic that can be handled is generally limited by the bandwidth or capacity of the communication links coupled to the nodal processor 12. Although two communication links 14 and 16 are shown in the illustrative example, it will be apparent that only a single channel may be utilized such as at node D as shown in FIG. 1. Various types of nodal processors are used in existing packet networks. These nodal processors route packets of traffic along various communication links towards their destination. The processors provide functions such as error checking and monitoring of network congestion. Processors at edge nodes also translate information carried in the packets to destination devices and receive information from source devices and process it into appropriate packet format. Key functions of the nodal processor in accordance with the present invention are described below.

An important aspect of the present invention resides in the ability of the nodal processor 12 to select between coding rates utilized by coders. This ability to select different rates is utilized to relieve temporary capacity overload.

Figure 3:
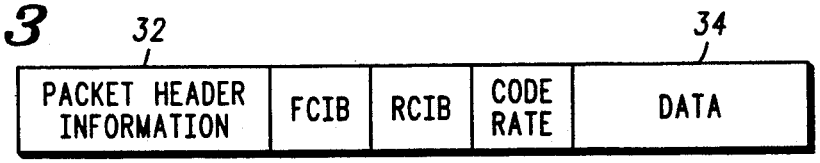
FIG. 3 graphically illustrates a packet format for use in the network in accordance with the present invention.

FIG. 3 illustrates a packet format for bursty coded information such as voice and video. The packet includes header information 32 which may include the logical channel number, discard priority, error check, and other information. The packet also includes a forward congestion indication bit (FCIB), a reverse congestion indication bit (RCIB) and a code rate field. The data portion 34 represents coded information to be communicated. The FCIB acts as a flag which is set by an intermediate node in the communication path through a packet network upon the node sensing a link overload condition. The RCIB also acts as a flag and is set by a destination node in packets traveling to the source node as feedback indicative of a link capacity overload in the forward direction. The code rate field defines the coding rate used for data 34 in each packet. A further explanation of the use and function of this packet format is provided in regard to FIGS. 7 and 8.

Figure 4:
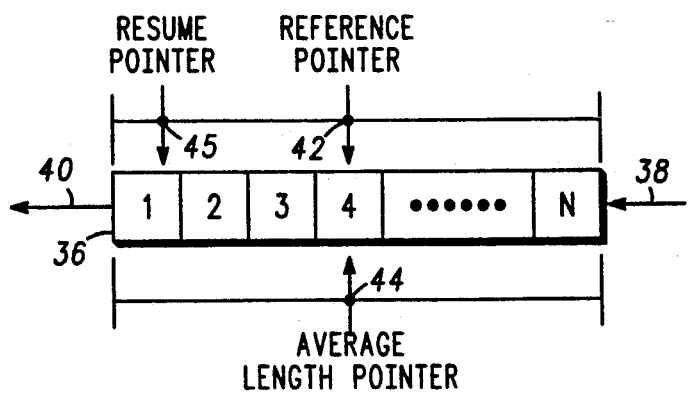
FIG. 4 illustrates a queue of a node in the packet network.

FIG. 4 is a representation of an output queue 36 of the nodal processors. Input 38 accepts arriving packets, and transmitted packets from the processor exit by output 40. The queue 36 provides buffering which permits a limited number of received packets to be temporarily stored prior to being transmitted. This buffering provides a smoothing function to accommodate simultaneous packet arrivals from multiple coders and other intermediate nodes and to absorb momentary capacity overloads. In accordance with the present invention, a reference pointer 42 and an average length pointer 44 are utilized. The reference pointer is set at a predetermined buffer depth and represents an acceptable amount of buffering in accordance with network considerations. The average length pointer 44 represents the average queue depth over a predetermined interval. The relative position of the average length pointer 44 relative to reference pointer 42 is utilized by the nodal processor to make a determination as to whether or not excessive network congestion (overload) is present. If the average length pointer exceeds the reference pointer as shown in the illustrative example in FIG. 4, congestion is determined to be present. Such a determination is utilized in conjunction with setting the FCIB flag as will be described in conjunction with FIG. 7. An average queue length is utilized as pointer 44 in order to minimize rapid fluctuations which might occur if the length of the queue was determined for each packet. When the average length pointer 44 decreases below reference pointer 42, the congestion is declared to have terminated.

Alternatively, a resume pointer 45 can be used for declaring the termination of the congestion period. The value of the resume pointer 45 is less than the reference pointer 42. As before, when the average length pointer 44 exceeds the reference pointer 42, congestion is determined to be present. Only when the average length pointer 44 decreases below the resume pointer 45, is the congestion declared to be terminated. This allows for further improvement in the stability of the feedback control.

Figure 5:
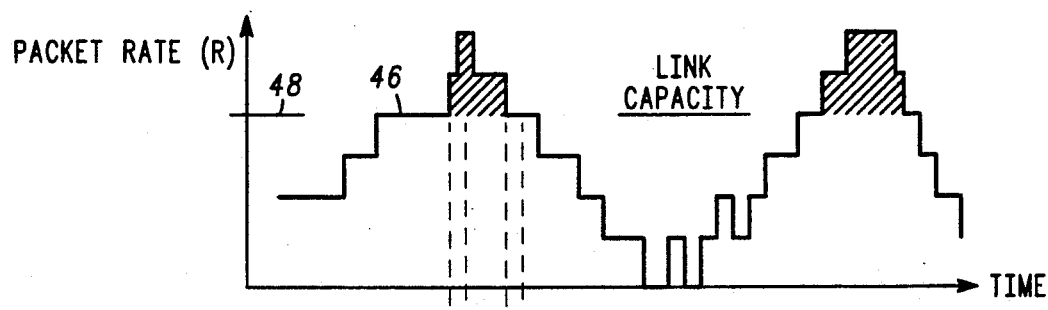
FIG. 5 is a graph illustrating the packet rate as a function of time with the shaded areas representing traffic demand above the capacity of a link.

FIG. 5 illustrates a graph of the packet rate 46 as a function of time on the link from node A to D of FIG. 1. The capacity of this link is indicated by reference line 48. The shaded area of graph 46 above reference line 48 represents the magnitude and time interval during which the link capacity has been exceeded. This graph illustrates conditions which would exist in a conventional packet network which does not employ the present invention. In this illustrative graph, the capacity overload could result from coincident talkspurts by a plurality of users on telephone instruments 10 attached to nodes B and C which are conversing with a plurality of users on telephone instruments 10 attached to node D. In a relatively low capacity link such an overload represents time intervals in which a number of users are concurrently providing traffic in excess of the maximum traffic which can be accommodated over the link. Such conditions exist where the intermittent properties of speech are utilized to achieve statistical gain as previously explained. The shaded areas in this graph would cause an increase of the length of the average queue beyond reference pointer 42 as seen in FIG. 4 wherein the queue of the nodal processor attempts to accommodate the excess traffic demand. It will be apparent that the queue 36 has a finite capacity which can be exceeded depending upon the magnitude and length of time of the overload. However, a condition in which an overload never occurs would represent a condition in which the link is not being utilized at an efficient capacity.

Figure 6:
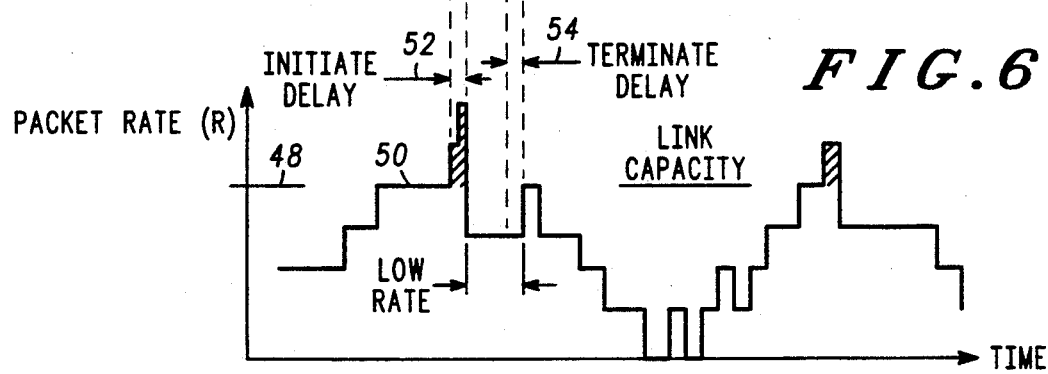
FIG. 6 is a graph that is identical to FIG. 5 except for the reduction in link overload in accordance with the present invention.

FIG. 6 is another graph of packet rate 50 as a function of time and is identical to graph 46 in FIG. 5 except for the differences resulting from the action of the present invention. After an initiate delay 52, the remainder of the capacity overload has been negated by the present invention causing the bursty data sources to switch to a lower rate. Following a termination delay 54 which begins at the end of the capacity overload period, the present invention causes the traffic sources to switch back to a higher rate which represents the normal transmission of such traffic. Thus, the present invention minimizes the time interval of the capacity overload period. The initiate delay represents the time required to recognize the overload condition and to effectuate a coder rate reduction. The terminate delay represents the delay associated with sensing the cessation of the overload condition and effectuating a coder rate increase. Both of these delays are generally a function of packet network parameters and are preferably short relative to the typical overload period.

Figure 7:
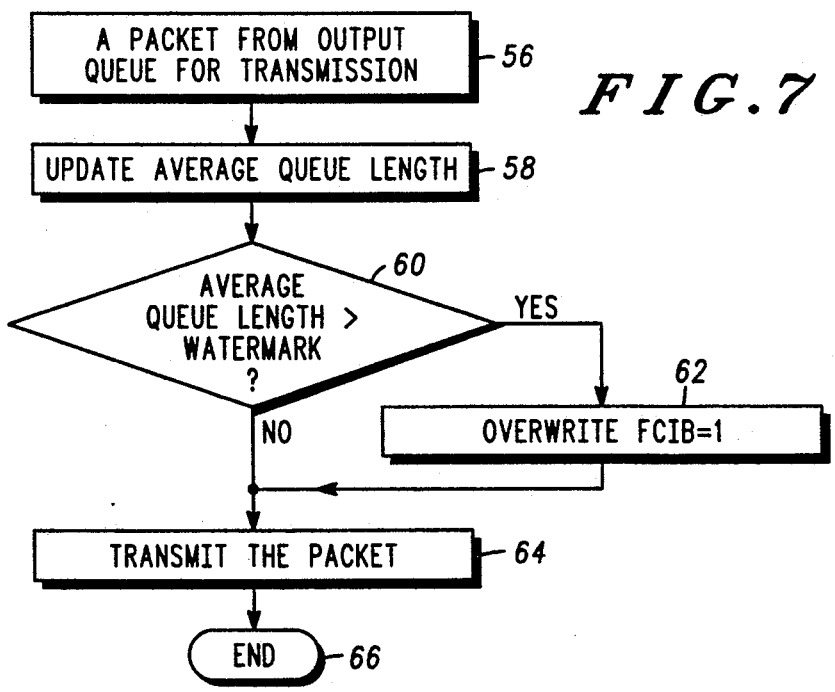
FIG. 7 is a flow diagram illustrating steps taken by an intermediate node in a packet network in accordance with an embodiment of the present invention.

FIG. 7 is a flow diagram which shows an exemplary method in accordance with the present invention for determining link capacity overload and communicating such a decision. Each intermediate node along a packet network path will have the capability of performing these steps. In step 56, a packet from the output queue of a node is readied for transmission. Step 58 provides an update of the average queue length; the operation of the queue and the average length pointer was described with regard to FIG. 4. In decision step 60, a determination is made if the average queue length is greater than a watermark, i.e. reference pointer. If YES the FCIB flag is set by overwriting this bit in the packet to equal 1. If NO, the FCIB is not altered. In step 64, the packet being readied is transmitted with the FCIB. These steps conclude at END 66. It will be apparent to those skilled in the art that these steps will be advantageously carried out in software or specialized hardware as part of the overall nodal processor function.

The intermediate nodes along the transmission path each make an independent determination of the overload condition. A positive decision by any of these nodes will cause the FCIB flag to be set. Thus, congestion at any node along the path is sufficient to initiate congestion control in accordance with the present invention.

Figure 8:
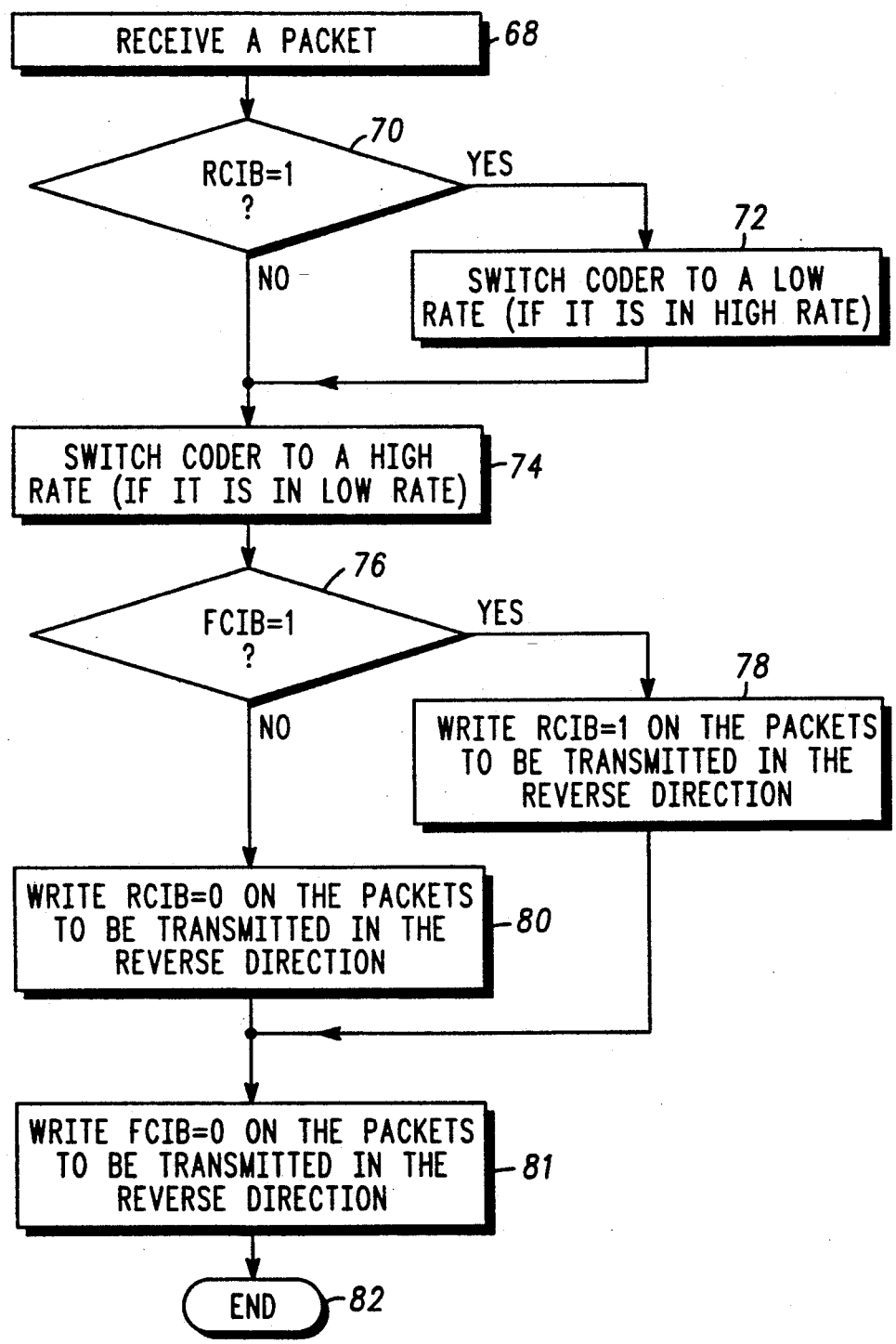
FIG. 8 is a flow diagram illustrating steps taken by an edge node of a packet network according to an embodiment of the present invention.

FIG. 8 is a flow chart indicating steps in accordance with the present invention taken by an edge node, i.e. an origination node or destination node in the packet network. In step 68 an edge node receives a packet. Decision step 70 determines if RCIB=1 in the received packet. If YES, the coder associated with the traffic is switched to a low rate if it was previously in a high rate. Thus, RCIB=1 represents the reverse flag having been set to indicate congestion. If NO, step 74 causes the corresponding coder to be switched to a high rate if it was in a low rate. Alternatively, the coder may remain in the low rate until the end of the current talkspurt and switch to the high rate at the beginning of the next talkspurt if there is no further notification of congestion being received.

Following the appropriate selection of the coder rate, decision step 76 determines if FCIB=1. This condition being true corresponds to an intermediate node having made a congestion determination. If YES, step 78 causes RCIB to be set equal to 1 on packets to be transmitted in the reverse direction, i.e. to the originating node of packets being sent in the forward direction. If NO, step 80 causes RCIB to be set equal to 0 on packets to be transmitted in the reverse direction. This corresponds with no congestion indication over the path. Step 81 causes FCIB to be set equal to 0 on packets transmitted in the reverse direction. These steps conclude with END 82. These steps will be advantageously integrated as part of the overall functionality of each edge nodal processor.

As an example of how this would operate, consider that a telephone instrument at node B in FIG. 1 is communicating with a telephone instrument at node D via the path B-A-D. The packet transmitted at node B would have FCIB=0, RCIB=0. Upon node A readying this packet for transmission to node D, assume that node A senses link overload and thus transmits the packet to node D with FCIB=1, RCIB=0. In accordance with FIG. 8, node D will start sending packets destined for node B with RCIB=1. Upon receipt of such a packet by node B, it will cause the corresponding coder to switch to a lower rate thereby lowering the quantity of link traffic. The time required for the coder to be changed from a high rate to a low rate corresponds to initiate delay 52.

As node B continues to send packets, assume node A now makes a determination that a link overload does not exist, thus FCIB=0. These packets are received at node D with the result that decision step 76 is negative. This causes RCIB=0 to be transmitted on packets destined for node B. Upon such packets being received at node B, decision step 70 will be negative thereby causing the associated coder to switch from the low rate to the higher or normal rate since the network congestion has dissipated. The time delay between the cessation of capacity overload and the ability to increase the coder rate corresponds to the terminate delay 54.

From the above explanation it should be noted that a packet network path is treated as two one way paths which must both exist in order for the RCIB to be transmitted back to its origination node. Thus, this permits the coder rate at each end of a two party telephone conversation to differ.

In absence of traffic flowing in the reverse direction to carry the RCIB flag, packets with an empty data field are created by the destination edge nodal processor to be returned to the originating edge nodal processor. These empty data packets would only have to be created when there is a change in the congestion state to be communicated to the encoder and there is no user traffic flowing in the reverse direction.

As an alternative to monitoring the average queue depth, other techniques may be used to determine congestion. The packet rate measured over a predetermined interval may be compared to a reference rate; if greater than the reference rate, congestion is declared. Also, the nodal processor can monitor the number of calls in talkspurt; if the number of calls in talkspurt is greater than a reference number, congestion is declared.

Although an embodiment of this invention has been described and shown in the drawings, the scope of the invention is defined by the claims which follow.

What is claimed is:

1. A method for minimizing traffic overload at an edge node in a packet network that carries bursty traffic and includes intermediate nodes through which traffic is routed, the method comprising the steps of:
   coding bursty information at one edge node into a digital format for transmission as packets to another edge node, the coding including a first coding rate utilized except during a traffic overload and a second coding rate less than the first rate;
   determining at said one edge node if a reverse congestion indicator (RCIB) in the header of a packet sent from said another node is set thereby indicating a traffic overload condition in the transmission path from said one edge node to said another node;
   if said RCIB is set, utilizing said second coding rate at said one node to reduce the traffic input into the network.

2. The method according to claim 1 further comprising the steps of:
   determining at said one edge node if a forward congestion indicator (FCIB) in the header of a packet sent from said another node is set thereby indicating a traffic overload condition in the transmission path from said another edge node to said one node;
   if said FCIB is set, said one edge node setting the RCIB in the header of a packet transmitted from said one edge node to said another edge node thereby communicating a traffic overload in the network to said another edge node.

3. The method according to claim 1 further comprising the steps of:
   at each intermediate node maintaining a measurement of traffic loading of packets flowing through said intermediate nodes;
   if said measurement exceeds a predetermined level at an intermediate node setting said FCIB in the header of packets passing through said intermediate node.

4. The method according to claim 3 wherein said maintaining step includes maintaining an average queue length measurement of packets flowing through said intermediate nodes.

5. The method according to claim 1 wherein said bursty traffic comprises voice traffic.

6. The method according to claim 1 wherein said bursty traffic comprises video traffic.

7. A packet network that carries bursty traffic and includes edge nodes that input traffic into the network and intermediate nodes through which traffic is routed comprising:
   means for coding bursty information at one edge node into a digital format for transmission as packets to another edge node, the coding means including a first coding rate utilized except during a traffic overload and a second coding rate less than the first rate;
   means for determining if a reverse congestion indicator (RCIB) in the header of a packet sent from said another node to said one node is set thereby indicating a traffic overload condition in the transmission path from said one edge node to said another node;
   if said RCIB is set, said determining means utilizing said second coding rate at said one node to reduce the traffic input into the network.

8. The packet network according to claim 7 further comprising:
   means at said edge nodes for determining if a forward congestion indicator (FCIB) in the header of a packet sent from said another node to said one node is set thereby indicating a traffic overload condition in the transmission path from said another edge node to said one node;
   if said FCIB is set, said FCIB determining means setting the RCIB in the header of a packet transmitted from said one edge node to said another edge node thereby communicating a traffic overload in the network to said another edge node.

9. The packet network according to claim 7 further comprising:
means at each intermediate node for maintaining a measurement of traffic loading of packets flowing through said intermediate nodes;
means for setting said FCIB in the header of packets passing through intermediate nodes if said measurement exceeds a predetermined level thereby providing a congestion indication.

10. The packet network according to claim 9 wherein said maintaining means includes means for maintaining an average queue length measurement of packets flowing through said intermediate nodes.

11. The packet network according to claim 7 wherein said bursty traffic comprises voice traffic.

12. The packet network according to claim 7 wherein said bursty traffic comprises video traffic.

* * * * *

UNITED STATES PATENT AND TRADEMARK OFFICE
CERTIFICATE OF CORRECTION

PATENT NO. :  5,115,429
DATED      :  May 19, 1992
INVENTOR(S) : Michael G. Hluchyj and Nanying Yin It is certified that error appears in the above-identified patent and that said Letters Patent is hereby corrected as shown below:

In the Abstract:

Line 4, "rate of a second" should be --rate or a second--.

Signed and Sealed this

Seventh Day of September, 1993

Attest:

BRUCE LEHMAN

Attesting Officer     Commissioner of Patents and Trademarks